Jan. 1, 1952

J. W. KARWEIT 2,581,258

DRILLER

Filed Aug. 12, 1943

INVENTOR.
John W. Karweit
BY
Watson D. Harbaugh
HIS ATTORNEY

Jan. 1, 1952

J. W. KARWEIT 2,581,258

DRILLER

Filed Aug. 12, 1943

INVENTOR.
John W. Karweit
BY
Watson D. Harbaugh
HIS ATTORNEY

Jan. 1, 1952
J. W. KARWEIT
2,581,258
DRILLER
Filed Aug. 12, 1943
3 Sheets-Sheet 3
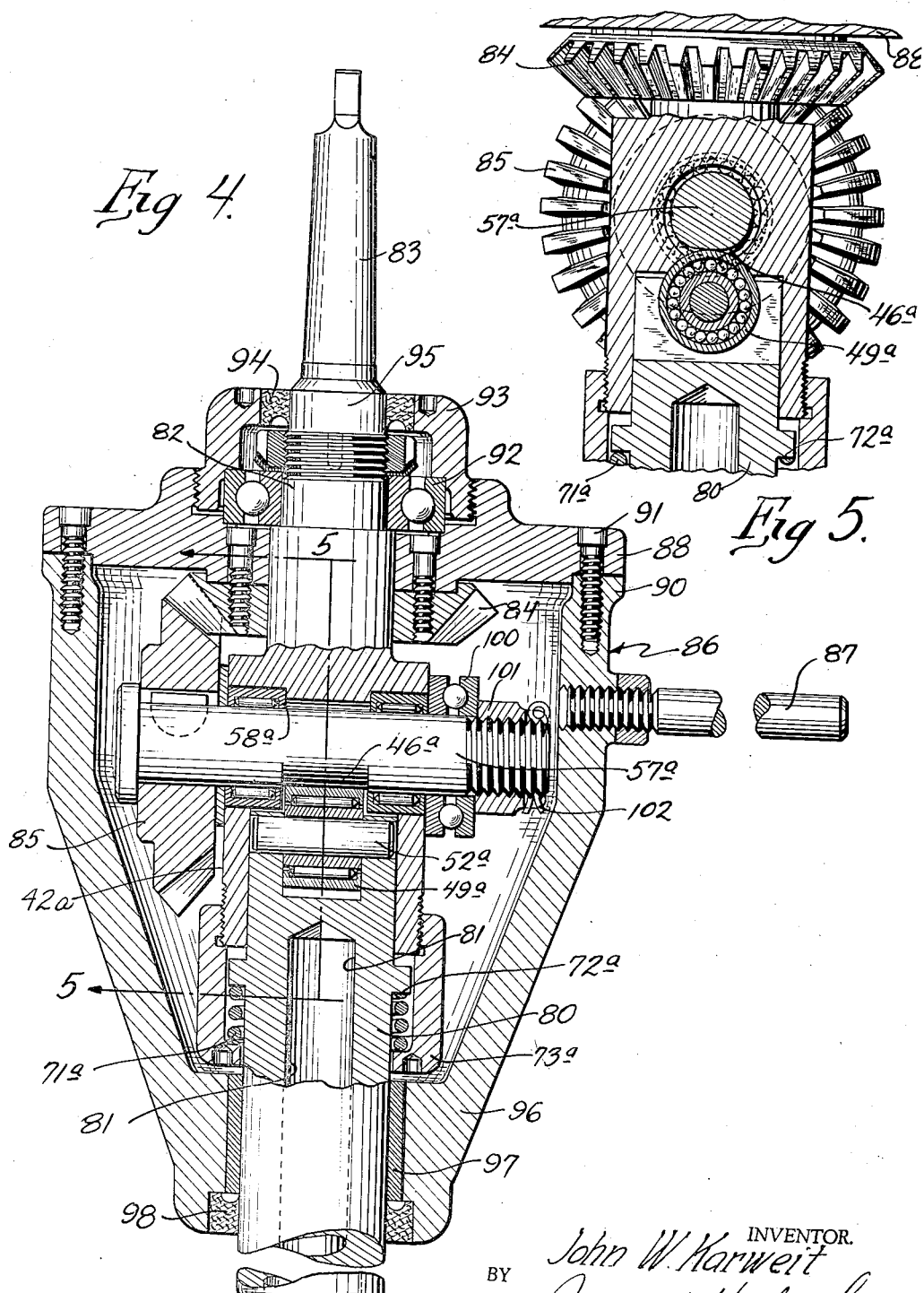

Patented Jan. 1, 1952

2,581,258

UNITED STATES PATENT OFFICE 2,581,258

DRILLER

John W. Karweit, Skokie, Ill., assignor, by mesne assignments, to Ex-Cell-O Corporation, Detroit, Mich., a corporation of Michigan Application August 12, 1943, Serial No. 498,314

10 Claims. (Cl. 77—32.3)

The present invention relates to the art of drilling a hole in a machinable material such as metals, alloys, elastomers and plastics, with a machine tool drill such as a twist drill.

Reference is hereby made to my copending applications Serial Nos. 484,612 (now Patent No. 2,453,136) and 455,417 (now Patent No. 2,453,137) to the extent that a better understanding of the principles herein incorporated may be had, the disclosures of these applications being hereby made a part of this application.

One of the objects of the present invention is to provide an attachment or construction for power driven machine tools by which a drill may be supported against or for rotation to oscillate axially in a predetermined manner and in a stepped or controlled relation to the relative rotation of a work piece and drill whereby chips are produced at the cutting edge or edges of the drill which are of a regulated and substantially uniform size and shape, in order to be able to clear the drill or flutes without packing and without scoring the side walls of the hole being formed.

Another object of the invention is to provide a rugged compact construction by which the purposes of the invention may be performed with large drills under circumstances in which the feed pressures to be borne by the device may be as much as 3000 lbs.

Another object of the invention is to provide a construction wherein a drill may be oscillated axially a small fraction of an inch while the end thrust pressures exerted upon the drill are transmitted between the cooperating parts along a line disposed within the confines of the spindle.

Another object of the invention is the provision of a construction which can be adjusted or made to provide a predetermined relation between the reciprocation of the drill and the relative rotation of the drill and work piece.

A further object of the invention is to balance and end thrust pressure effort for a drill upon the opposite side of the axis of relative rotation between the drill and work piece, with a single cam and follower engagement for reciprocating the drill.

These being among the objects of the present invention, other and further objects will be apparent from the drawings, the description relating thereto and the appended claims.

Referring to the drawings:

Fig. 4 is a vertical section taken through an attachment illustrating another form of the invention which would be employed if the turret lathe were provided with a rotary spindle, or could be used upon a large drill press to take drills as large as two inches in diameter.

Fig. 5 is a section taken upon the line 5—5 of Fig. 4.

Generally speaking, the size of the chips are determined by repeatedly lifting the feed pressure and the drill during the feed traverse to allow the edge or edges of the drill to sever from the work piece the chips being formed and then returning the drill to its cutting position to make other chips to be severed like the first. Preferably, the cutting edges are lifted slightly from cutting engagement at predetermined intervals, which intervals are stepped to the relative rotation of the drill and the work piece so that the chips are fairly uniform in size and shape and are suitable for quick and complete removal from the hole so that they are released quietly and safely at the mouth of the hole for disposal and reclamation.

In operation, the duration of the cutting engagement with the work piece between severances just mentioned, may be varied with the material being drilled and in the present invention can be varied or adjusted while the drilling operations are proceeding. In general, and by way of example, the duration of the cutting engagement should be long enough for a cutting edge to cut through that point upon the work piece where a preceding severance was had within a revolution of the drill preceding the next severance to be made.

Figure 1:
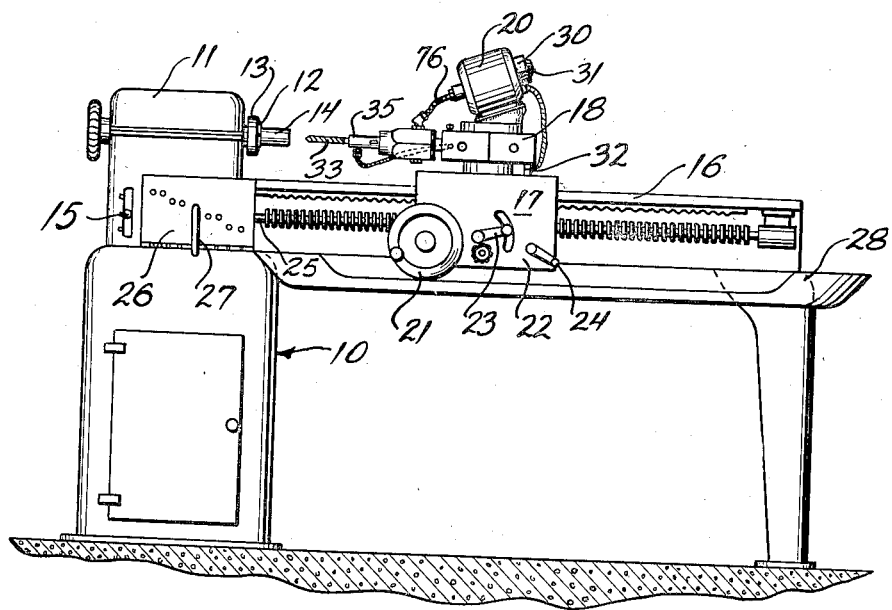
Fig. 1 is a side elevation of a turret lathe upon the turret of which a preferred embodiment of the invention is installed either as an attachment or as original equipment.
Figure 3:
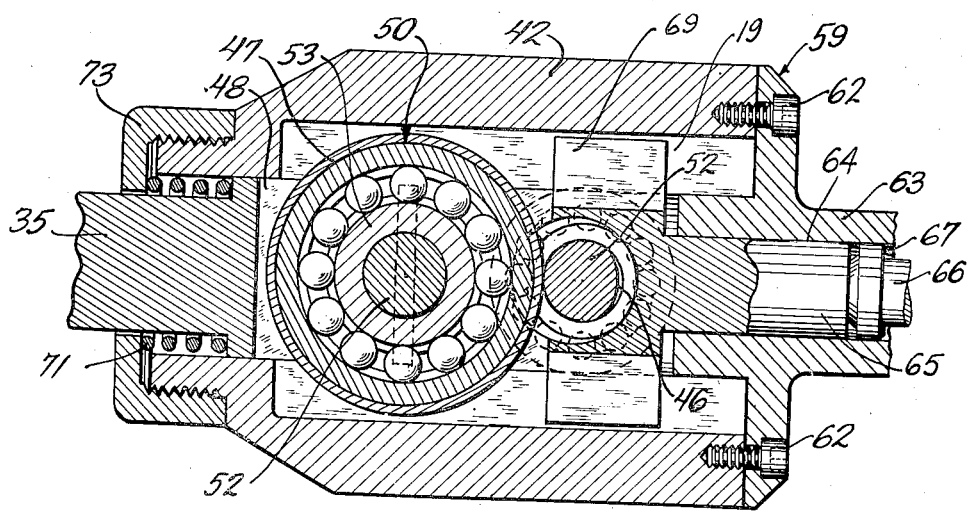
Fig. 3 is a section taken upon the lines 3—3 in Fig. 2.
Figure 2:
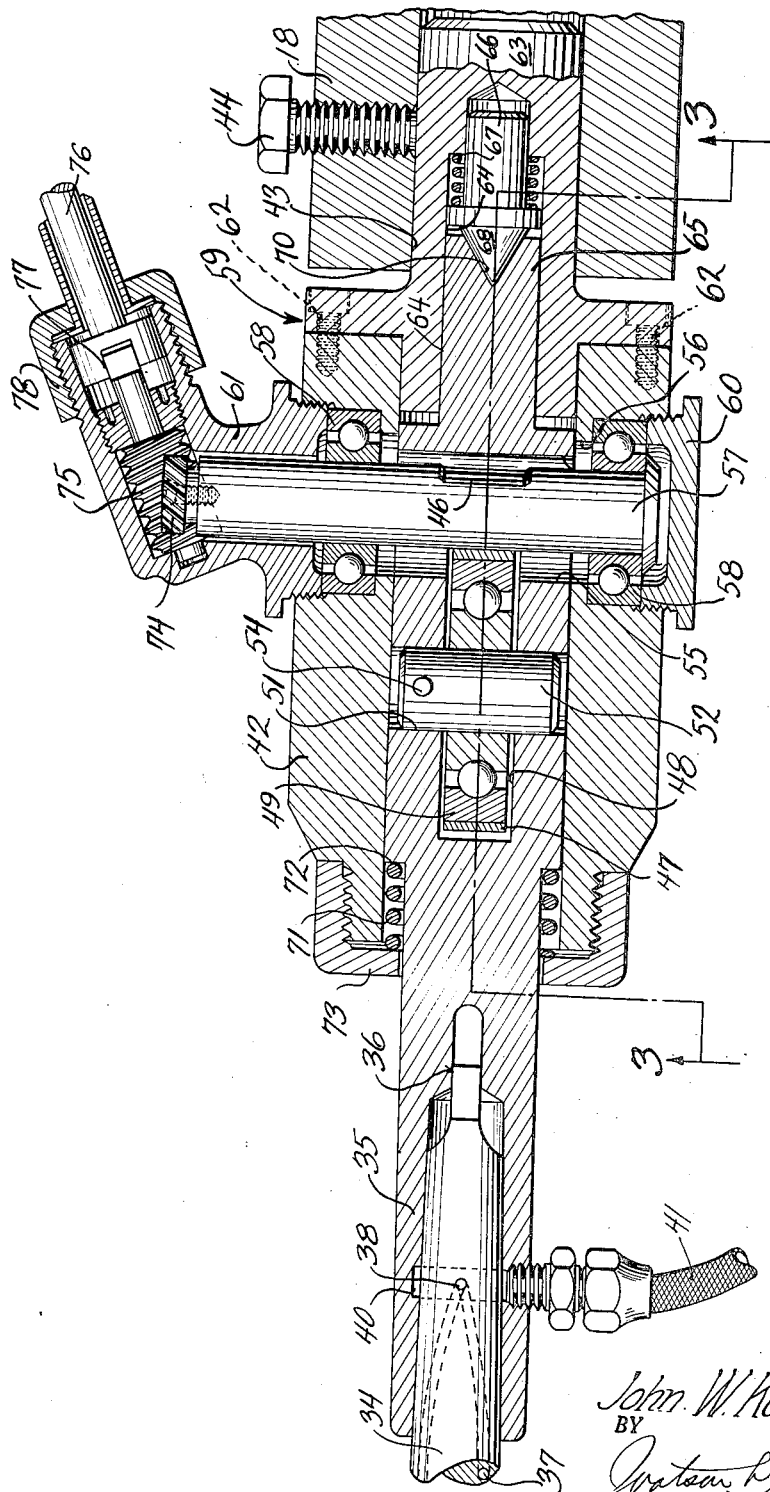
Fig. 2 is a longitudinal section through the preferred embodiment shown in Fig. 1.

This is accomplished upon a turret lathe as illustrated in Figs. 1, 2 and 3. In Fig. 1 a turret lathe is shown at 10 which is provided with the usual head 11 and collet chuck 12 on the head spindle 13 to support and rotate a work piece 14. The speed at which the work piece 14 is rotated is controlled by means of a manual speed selector 15 which controls either a gear box or a multi-speed motor (not shown) by which the head spindle 13 is driven.

The bed of the lathe is shown at 16 upon which is mounted for forward and reverse traverse a carriage 17. The carriage 17 is traversed on the bed 16 either manually or automatically. Manual feed is accomplished by the hand wheel 21 mounted upon a carriage apron 22. Automatic feed is accomplished by means of a shift lever 23 and reversing lever 24 which control a mechanism not shown that cooperates with the threads upon the worm feed shaft 25 driven from the gear box 26 as controlled by a speed preselector or lever 27. Below the bed an oil catch 28 is provided which drains to an oil sump (not shown) from which the oil is pumped by pressure to flood the tool and work piece.

The carriage 17 carries a rotatable turret 18, preferably of hexagonal shape, adapted to hold and support different tools, such as reamers, counterbores and cutters (not shown). Upon one of these faces is mounted an embodiment of the invention as actuated by an electromagnetic means, such as an electric motor 20.

The speed of the motor is controlled by a centrifugal switch 30 (not shown) which is adjusted by a manual control 31 and is placed in operation only when the turret is in one particular position as where a drill is located in working position for the work piece 14. This operation of the motor 20 is controlled by switch contacts 32 which are brought into engagement with each other when the working position is established.

As more particularly shown in Fig. 2 the drill 33 is an oil fluted twist drill provided with a tapering shank 34 that is received in a supporting element 35 as held against rotation by a tang and socket assembly 36. The oil flutes 37 open upon the face of the shank 34 as at 38 where they are in register with an internal groove 40 in the supporting member to receive a supply of oil from a pressure line 41. The supply of oil is controlled through a suitable valve mechanism, which is not shown, to permit the oil to flow into the drill only when the drill is in working position with respect to the work piece 14.

The drill support 35 is reciprocably mounted upon a supporting element 42 that in turn is received in a socket 43 upon the turret 18 where it is locked in place by means of a set screw 44.

Oscillation of the drill support 35 in the supporting element 42 is had by means of a cam 46 and follower 47 which will now be described.

A radially disposed slot 48 is cut through the central portion of the driller support 35 to receive a frictionless bearing 50 upon the outer race 49 of which is pressed the follower 47. A bore is provided as at 51 (Fig. 2) to receive a shaft 52 which supports the inner race 53 of the bearing 50. The shaft 52 is held in place by a pin 54 and the end thrust effort exerted upon the drill 33 is borne by the shaft 52 and bearing 50 to the follower 47.

A second bore is provided as at 55 in the drill support 35 to register with a bore 56 in the supporting element 42. In these bores is disposed a shaft 57 journalled upon the supporting member 42 by frictionless bearings 58 which are held in place by a cap nut 60 at one end and a transmission housing 61 at the other end. The cam 46 comprises a relief cut in the outer face of the shaft 57 preferably within an arc of 60 degrees and to a depth of from .010 to .035 of an inch to engage and cooperate with the track or follower 47 upon the bearing 50. Thus, the peripheral face of the cylindrical shaft 57 defines a dwell area or portion extending over the major portion of the circumference, and the relief defines an offset portion, the dwell portion and relief portion constituting the complete cam.

Ears 69 sliding in slideways 19 upon the supporting element 42 carry the torque strains exerted upon the drill support 35.

The supporting element 42 is secured rigidly to a secondary element 59 by means of screws 62. This secondary element is provided with a shank 63 which is engaged by the lock screw 64 upon the turret head 18. The end thrust effort existing at the follower 47 is transmitted to the turret 18 through the shaft 57, the bearings 58 and the secondary element 59.

A socket 64 is provided in the secondary element 59 to receive in reciprocable relationship a reduced end 65 upon the drill support 35, and a conical centering pin 66 is mounted in the secondary element as urged by a compression spring 67 to carry a conical portion 68 thereof into engagement with a conical socket 70 upon the reduced end 65.

The track 47 and cam 46 are urged to cooperate with each other by means of a compression spring 71 resting against a shoulder 72 upon the drill support element 35 as held in place by a gland nut 73. With this construction the drill support 35 is held in alignment between the turret head 18 and work piece 14 by the supporting element 42 and the secondary element 59 for reciprocable movement as controlled by the cam 46, follower 47 and the spring 71.

Reciprocation of the drill support is accomplished by rotating the shaft 57 and although there may be different ways of doing this, two preferred forms are shown, one of which is accomplished by an independent prime mover if the drill 33 is held against rotation, while the other is by a gear arrangement (see Figs. 4 and 5) if the drill is rotated.

In order to accomplish rotation of the shaft 57 by the motor 20 a worm wheel 74 is mounted upon the upper end of the shaft 57 where a worm screw 75 engages and rotates it as driven by the motor 20 through a flexible shaft 76 and a detachable connection which comprises a detachable tang and groove assembly 77 held in engagement by a cap nut 78. The speed at which the shaft 57 is rotated determines the number of reciprocations imparted to the drill and this can be varied by means of the speed control 31 upon the motor 20.

With this arrangement whenever the drill 33 is brought into working position with respect to the work piece 14 the contacts 32 are closed to start the motor 20. The speed of the motor is then adjusted by the hand adjustment 31 in relationship to the speed at which the work piece 14 is rotated so that the chips formed by the drill 33 as reciprocated by the follower 47 and cam 46 will be of a size sufficiently small to clear the flutes of the drill easily, yet not large enough to bind and score the walls of the hole being cut.

This adjustment and the speed of the motor 20 enable the operator to provide the best chip size for any given material merely by a single adjustment. After becoming familiar with the invention an operator will be able to adjust the speed of the motor 20 to provide the optimum results available for a given drill and a given material of which the work piece 14 is made. By way of assisting the operator, however, in placing the invention into operation it is suggested that the reciprocation of the drill 33 should be once each relative rotation between the work piece and the drill if the drill is a double edge drill such as twist drills. In event a drill 33 is used which has a single cutting edge, such as a rifle drill, it is suggested that the reciprocation should be slightly less frequent than once each relative rotation, it being desirable that the cutting edge of the drill cut away the hump left by a prior reciprocation before leaving another one in a subsequent reciprocation.

In the embodiment shown in Figs. 4 and 5, a drill support is shown at 80 as provided preferably with a Morse #4 taper 81 to receive the tapered shanks of a large range of drills with or without adapters, and the supporting element 42a as shown at 82 is provided at the top with a Morse #3 taper 83 to be received in Morse #3 or 4 spindle tapers with or without adapters as the case may be.

In this particular embodiment a stationary beveled gear 84 is provided to engage a beveled gear 85 mounted upon the shaft 57a. Thus as the supporting element and the drill support rotate, the shaft 57a is compelled to rotate by the action of the gears 84 and 85 and the speed ratio between the gears 84 and 85 establishes the relation that the number of reciprocations bear to the number of revolutions of the drill in a given time. It is preferred with this arrangement that the gear 85 be slightly smaller or larger than the gear 84 to provide a slight creep of the oscillation point one way or the other.

In order to hold the gear 84 stationary a housing 86 is provided and supplied with an outrigger 87 that rides against a stationary part of a power tool such as the standard of a drill press (not shown).

The housing comprises an upper part 88 bolted to a lower part 90 by means of bolts 91 as carried by a frictionless bearing 92 held in place by a cap 93 having a suitable grease seal 94 cooperating with a cylindrical surface 95 just below the Morse #3 taper 83. At its lower end 96 the housing 86 is provided with a bearing 97 which journals the drill support 80 with respect to the housing 86, a suitable oil seal being indicated at 98.

Otherwise the parts shown in Figs. 4 and 5 which are similar or correspond to parts described in connection with the embodiments illustrated in Figs. 2 and 3 are provided with like numbers with the suffix "a" added. In both constructions the feed thrust is borne along a substantially direct line from the support points to the tip of the drill 33.

In the embodiment shown in Figs. 4 and 5 the bearings employed to support the cam and follower elements are needle bearings instead of ball bearings and centrifugal effort exerted upon the shaft 52a because of the bodily rotation thereof is absorbed and counteracted by an end thrust bearing 100 held in place by a castellated nut 101 locked by a cotter pin 102.

Thus, having described the invention and certain modifications thereof, it will be readily apparent to those skilled in the art that various and further modifications and changes may be made to embody the objects mentioned without departing from the spirit and substance of the invention the scope of which is commensurate with the appended claims.

What is claimed is:

1. A device for drilling a machinable material which includes a drill support, an element supporting the drill support for relative axial movement and against relative rotation between them, means for feeding said element axially of said drill support, a cam unit having a dwell portion and an offset cam portion, said offset portion extending only through a minor portion of the cam circumference, a follower unit, one of said units being supported by the element, the other of said units being supported by the drill support, said units coacting with each other at a point of engagement disposed within the axial projection of the element supporting the drill support whereby the feed thrust effort upon the drill is borne within the confines of said element.

2. A device for drilling a machinable material including a holder for a machine tool drill, an element for supporting the holder against radial displacement and for relative axial displacement with respect to the axis of the drill, a rotatable element disposed with the axis thereof at an angle to the axis of the drill, a second rotatable element journalled upon the holder and engaging the first element at a point approximately in line with the axis of the drill, means for rotating one of said elements by positive action, a cam upon one of the elements having a relief adapted to be engaged by the other of the elements, and means for urging the element on the holder into contact with the other element.

3. A device for drilling a machinable material including a holder for a machine tool drill, an element for supporting the holder for relative axial displacement with respect to the axis of the drill, a rotatable element disposed with the axis thereof at an angle to the axis of the drill, a second rotatable element journalled upon the holder and engaging the first element at a point approximately in line with the axis of the drill, means for rotating one of said elements by positive action including a speed controlled driving mechanism, a cam upon one of the elements having a relief adapted to be engaged by the other of the elements and means for urging the rotatable elements into contact with each other.

4. A device for drilling a machinable material including a holder for a machine tool drill, an element for supporting the holder for relative axial displacement in line with the axis of the drill, a rotatable element disposed with the axis thereof at an angle to the axis of the drill, a second rotatable element journalled upon the holder and cooperating with the first element, means for rotating one of said elements by positive action including a transmission interconnecting the supporting element and said rotated element, a cam upon one of the elements having a relief adapted to be engaged by the other of the elements, and means for urging the holder to carry the elements carried by it into contact with the other element.

5. A device of the type described for rotary drilling a machinable material including a rotating supporting member, a supported member mounted for reciprocation and adapted to receive in supporting relation a drill, means for rotating the supported member and a work piece with respect to one another, cam and follower elements, one of said elements being mounted upon one of the members and the other of said elements being mounted upon the other of said members, means urging the members to reciprocate with respect to each other in relation to the action of said elements whereby the feed thrust pressure upon the drill is borne by the members and elements, and means for rotating one of the elements with respect to the other at a speed different than the speed of relative rotation between the work piece and supported member, said cam element having two relatively offset operative surfaces thereon of unequal lengths.

6. A device of the class described for drilling a machinable material, a drive member adapted to be mounted for rotation with a spindle and having a socket in the end, a driven member received in said socket for rotation with the drive member and for reciprocation with respect to the drive member, a shaft journalled in the drive member and having a cam thereon, said cam having an offset duration of a minor portion of a revolution, a follower mounted in the driven member to cooperate with the shaft to reciprocate the driven member, means for rotating the shaft in relation to the rotation of the driven member, and means urging the follower to cooperate with said cam.

7. A device of the class described for drilling a machinable material, a drive member adapted to be mounted for rotation with a spindle and having a socket in the end, a driven member received in said socket for rotation with the drive member and for reciprocation with respect to the drive member, a shaft journalled in the drive member and having a cam with a dwell thereon and an offset duration of a minor portion of a revolution beyond said dwell, a follower mounted in the driven member to cooperate with the shaft to carry the feed pressure on the dwell, means for rotating the shaft in relation to the rotation of the driven member including a transmission between the shaft and one of said members, and means urging the follower to cooperate with said cam.

8. A device of the class described for drilling a machinable material, a drive member adapted to be mounted for rotation with a spindle and having a socket in the end, a driven member received in said socket for reciprocation therein and rotation with the drive member, a shaft journalled in the drive member and having a cam thereon, a follower mounted in the driven member to cooperate with the shaft to reciprocate the driven member, said cam having an offset duration of approximately 60° of relative rotation between it and said follower means for rotating the shaft in relation to the rotation of the driven member including a transmission between the shaft and one of said members having other than a one to one speed ratio, and means urging the follower to cooperate with said cam.

9. For use in a machine tool having two parts rotatable and traversable with respect to each other, a device for drilling a machinable material comprising an elongated member adapted at one end to be received in supported relation upon one of the parts, a shaft journalled on said member and having a cam track thereon with a dwell over a major portion of the shaft circumference and a radially offset cam area over a minor portion of said circumference, a second member adapted to support a drill and being reciprocably mounted with respect to the first member, a cam folower carried by the second member and cooperating with said cam track, means for rotating the shaft to oscillate the drill within a minor portion of a revolution of the shaft, and means upon said other part for supporting a work piece.

10. A chip comminutor for a driller, said comminutor comprising a supporting sleeve element receivable in axial feed traversable relationship upon the driller, a supported element adapted to receive a drill and reciprocably mounted upon the supporting element for relative movement along a line coinciding with the line of feed traverse, a housing carried by said supporting element and supported against rotation, means for moving said supporting element in said feed traverse, means for jointly rotating said elements, and means for reciprocating said elements with respect to each other in the course of said feed traverse, said last mentioned means including a rotary cam journalled in said supporting element on a transverse axis, said cam having an offset constituting a minor portion of the cam path, a follower supported on said supported element for coaction with said cam, resilient means for urging said cam and follower into engagement with each other, and a gear transmission interconnecting said housing and said cam, and having a ratio other than one-to-one to the rotation of said elements, whereby upon rotation of said supported element a chip comminuting oscillation is imparted to the drill in stepped relation to the rotation of the drill.

JOHN W. KARWEIT.

REFERENCES CITED

The following references are of record in the file of this patent:

UNITED STATES PATENTS

| Number | Name | Date |
| --- | --- | --- |
| 378,344 | Thomson | Feb. 21, 1888 |
| 463,973 | Palmer | Nov. 24, 1891 |
| 673,533 | Burwell | May 7, 1901 |
| 968,718 | Wahlstrom | Aug. 30, 1910 |
| 2,092,755 | Francesco | Sept. 14, 1937 |
| 2,195,052 | Wallace | Mar. 26, 1940 |
| 2,276,611 | Connor | Mar. 17, 1942 |
| 2,308,990 | Mellon | Jan. 19, 1943 |
| 2,328,542 | Bates | Sept. 7, 1943 |